United States Patent
Rea et al.

(10) Patent No.: US 7,188,458 B2
(45) Date of Patent: Mar. 13, 2007

(54) MACHINE AND METHOD FOR MAKING FILTER BAGS OF TETRAHEDRAL SHAPE FOR INFUSION PRODUCTS

(75) Inventors: Dario Rea, Monterenzio (IT); Sauro Rivola, Riolo Terme (IT)

(73) Assignee: I.M.A. Industria Macchine Automatiche S.p.A., Bologna (IT)

( * ) Notice: Subject to any disclaimer, the term of this patent is extended or adjusted under 35 U.S.C. 154(b) by 0 days.

(21) Appl. No.: 10/497,005

(22) PCT Filed: Oct. 6, 2003

(86) PCT No.: PCT/IB03/04396

§ 371 (c)(1),
(2), (4) Date: May 27, 2004

(87) PCT Pub. No.: WO2004/033303

PCT Pub. Date: Apr. 22, 2004

(65) Prior Publication Data

US 2004/0261370 A1   Dec. 30, 2004

(30) Foreign Application Priority Data

Oct. 9, 2002   (IT)   .......................... BO2002A0638

(51) Int. Cl.
B65B 61/14   (2006.01)
B65B 5/00   (2006.01)
(52) U.S. Cl. ..................................... 53/134.2; 53/267
(58) Field of Classification Search ............... 53/134.2, 53/410, 468, 562, 267, 285, 572
See application file for complete search history.

(56) References Cited

U.S. PATENT DOCUMENTS 3,728,840 A * 4/1973 Izumi .......................... 53/455

(Continued)

*Primary Examiner*—Rinaldi I. Rada
*Assistant Examiner*—John Paradiso
(74) *Attorney, Agent, or Firm*—Arent Fox LLP

(57) ABSTRACT

A machine (100) for making filter bags (1) of tetrahedral shape for infusion products (P) comprises a production line (L) defined by a series of operating stations (50, 9, 10, 14, 11, 12, 13) where filter bags (1) made from a continuous flattened tube (2) of filter paper are formed, filled with respective doses of infusion product (P) and subjected to successive cuts and closing seals (SL, ST, SC). The production line (L) extends in a direction parallel to the direction (A) and comprises, in succession, a first sealing station (50) for making the first longitudinal seal (SL) to form the tube (2) so that it extends in the horizontal direction (A); a second tube (2) sealing station (9) for making a succession of transversal seals (ST) on the tube (2) transversally to the horizontal direction (A); a cutting station (10) for cutting the tube (2) at the transversal seals (ST) so as to create a succession of filter bags (1) in the process of being formed, each having a sealed bottom end and an unsealed end (7); a station (11) for opening the unsealed end (7) of each filter bag (1); a station (12) for dosing the infusion product (P), where a dose of the product (P) is inserted into the filter bag (1) through the unsealed opened end (7); and a third sealing station (13) for making a seal (SC) that closes the end (7) of each filter bag (1) that is still open; the closing seal (SC) extending in a direction transversal to the aforementioned longitudinal seal (SL) and to the aforementioned transversal seal (ST).

18 Claims, 5 Drawing Sheets

U.S. PATENT DOCUMENTS

| | | | |
|---|---|---|---|
| 3,950,918 A * | 4/1976 | Morrow et al. | 53/410 |
| 4,774,797 A * | 10/1988 | Colamussi et al. | 53/459 |
| 5,161,350 A * | 11/1992 | Nakamura | 53/412 |
| 5,552,164 A * | 9/1996 | Kuipers et al. | 426/80 |
| 5,606,844 A * | 3/1997 | Takagaki et al. | 53/410 |
| 5,722,217 A * | 3/1998 | Cloud | 53/455 |
| 6,050,059 A * | 4/2000 | Rea | 53/413 |
| 6,199,349 B1 * | 3/2001 | Lerner | 53/472 |
| 6,668,518 B2 * | 12/2003 | Rea | 53/134.2 |

* cited by examiner

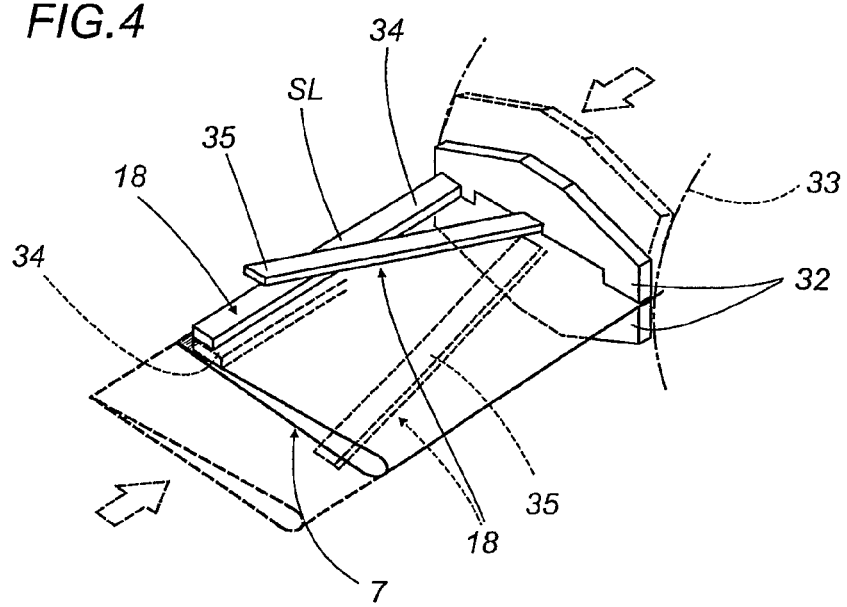
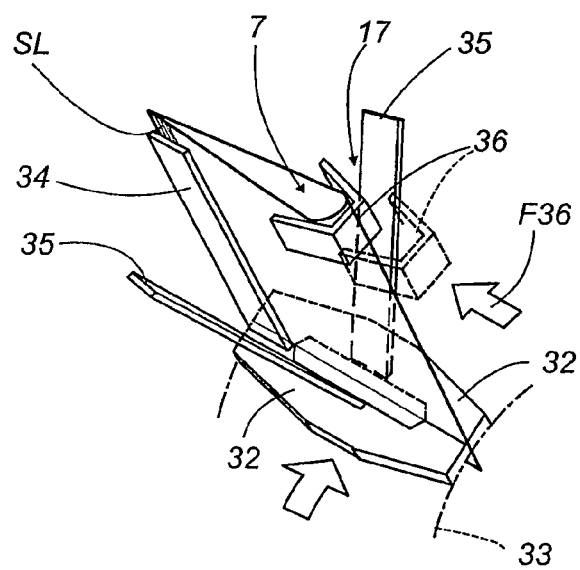
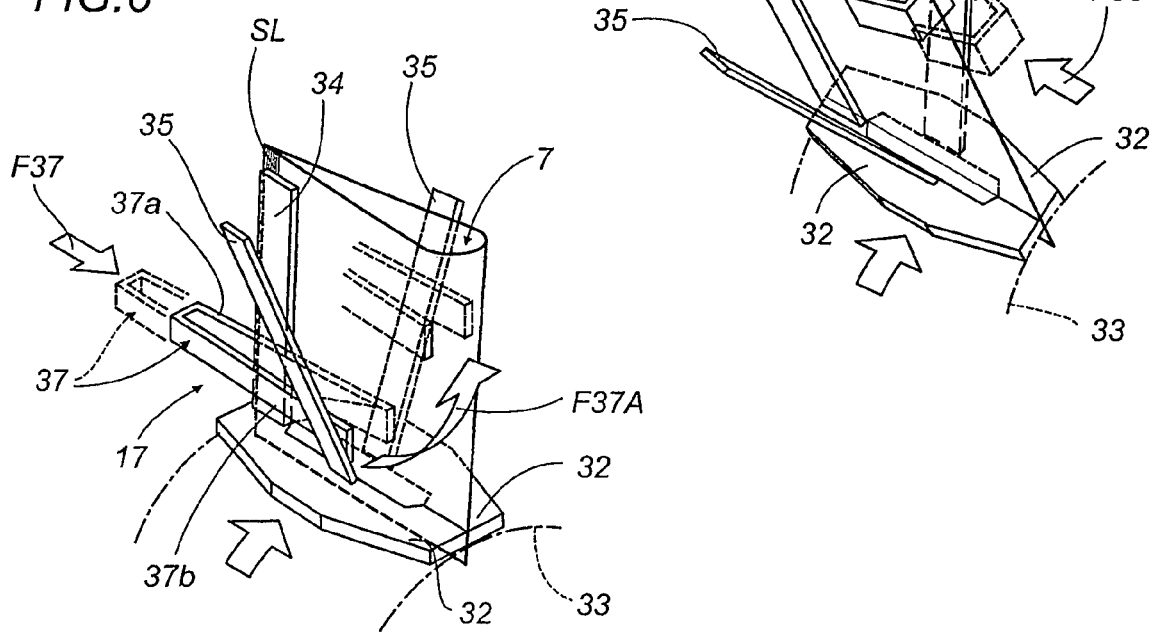

MACHINE AND METHOD FOR MAKING FILTER BAGS OF TETRAHEDRAL SHAPE FOR INFUSION PRODUCTS

CROSS-REFERENCE TO RELATED APPLICATION

This application is a National Stage entry of International Application No. PCT/IB2003/004396, filed Oct. 6, 2003, the entire specification claims and drawings of which are incorporated herewith by reference.

TECHNICAL FIELD

The present invention relates to a machine and method for making filter bags for infusion products such as tea, camomile and the like.

In particular, the invention relates to filter bags of tetrahedral or pyramidal shape and to their production.

BACKGROUND ART

The most familiar and widely adopted types of filter bags on the market today are those with one or two lobes, or product containing segments, of substantially flattened shape and formed from filter paper wrapped around the charges of infusion product to form a tube.

Other types of filter bags also known and used, although less widespread than the commercially more popular single or two-lobe bags, are those of three-dimensional shape, such as the pouch-like bag described in United States patent U.S. Pat. No. 2,187,417, or those of tetrahedral shape, hereafter also referred to as "pyramidal" for convenience, as described in United States patent U.S. Pat. No. 4,290,521.

In one of its aspects, the invention is specifically concerned with the steps of forming the pyramidal filter bag, filling it with infusion product and finally sealing it.

A prior art machine for making pyramidal filter bags is described in United States patents U.S. Pat. No. 4,290,947 and U.S. Pat. No. 5,548,947. This machine comprises a station for continuously feeding a web of filter paper, and a station for forming a continuous tube extending vertically; a dosing unit for filling doses of infusion product into the vertical tube; sealing/folding stations for making seals/folds and designed to make the transversal seals in succession and again working in a vertical direction, by sealing the tube together with the folds necessary to make the pyramidal shape.

In practice, the pyramidal filter bag according to the above mentioned United States patents is made in a vertical production line using a process that includes the steps of positioning and longitudinally sealing the filter bag to form the tube; making a first transversal closure at the lower end of the tube; filling a dose of product into the lower end of the tube, depositing it by gravity; making a second transversal closure, at 90° to the previous one, so as to form the pyramidal shape; and, finally, cutting the filter paper tube to form the pyramidal filter paper bags in succession.

This process, however, has notable disadvantages due especially to the dosing unit which meters and fills the infusion product into the tube at the dosing station of the pyramidal filter-bag making machine.

Indeed, the dosing unit normally comprises a hollow cylindrical element into which the doses of infusion product are metered and which subsequently releases the doses one after the other into the lower end of the filter paper tube. This cylindrical element extends vertically and has a considerable length.

Dosing operations within the hollow cylindrical element have inherent speed limitations on account of their complexity and therefore significantly slow down the operation of the tea-bag making machine as a whole. Further speed limitations are due to the complex sealing operations by which the end of the filter paper is closed to give the filter bag its pyramidal shape.

Thus, machines that make pyramidal filter bags of the type described above operate only at limited speeds and, hence, cannot meet current market demands for high speeds and large volumes of production.

The present invention therefore has for an object to provide a machine and a related filter bag production method that overcome the above mentioned drawbacks of prior art.

DISCLOSURE OF THE INVENTION

Accordingly, this invention provides a machine for making filter bags of tetrahedral shape for infusion products, the machine comprising a production line defined by a series of operating stations where filter bags made from a continuous flattened tube of filter paper are formed, filled with respective doses of infusion product and subjected to successive cuts and closing seals; the machine being characterised in that the production line extends in a horizontal direction and comprises, in succession, a first sealing station for making the first longitudinal seal to form the tube so that it extends in a direction parallel to the horizontal direction; a second tube sealing station for making a succession of transversal seals on the tube transversally to the horizontal direction; a cutting station for cutting the tube at the transversal seals so as to create a succession of filter bags in the process of being formed, each having a sealed bottom end and an unsealed end; a station for opening the unsealed end of each filter bag; a station for dosing the infusion product, where a dose of the product is inserted into the filter bag through the unsealed opened end; and a third sealing station for making a seal that closes the end of each filter bag that is still open; the closing seal extending in a direction transversal to the aforementioned longitudinal seal and to the aforementioned transversal seal.

This invention also provides a method for making filter bags of tetrahedral shape for infusion products, the method being characterised in that it comprises the following steps, performed in a production line extending in a horizontal direction: forming a continuous flattened tube of filter paper; making on the tube a longitudinal seal extending parallel to the horizontal direction; making a succession of transversal seals on the tube transversally to the horizontal direction; cutting the tube at the transversal seals so as to create a succession of filter bags in the process of being formed, each having a sealed bottom end and an unsealed end; opening the unsealed end of each filter bag; dosing the infusion product into the filter bag through the unsealed opened end; making a further seal to close the open end of each filter bag transversally to the aforementioned longitudinal seal and to the aforementioned transversal seal.

BRIEF DESCRIPTION OF THE DRAWINGS

The technical characteristics of the invention, with reference to the above aims, are clearly described in the claims below and its advantages are apparent from the detailed description which follows, with reference to the accompanying drawings which illustrate a preferred embodiment of the invention provided merely by way of example without restricting the scope of the inventive concept, and in which:

FIGS. 4, 5 and 6 are close-up views showing successive steps performed at one of the stations forming part of the machine of FIG. 3;

DETAILED DESCRIPTION OF THE PREFERRED EMBODIMENTS OF THE INVENTION

Figure 1:
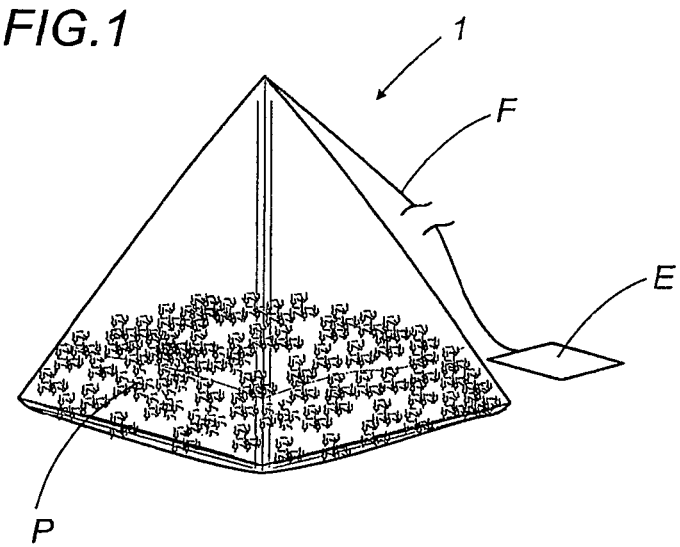
FIGS. 1 and 2 are, respectively, a front perspective view and a plan view of a pyramidal filter bag made by the machine according to the present invention.
Figure 2:
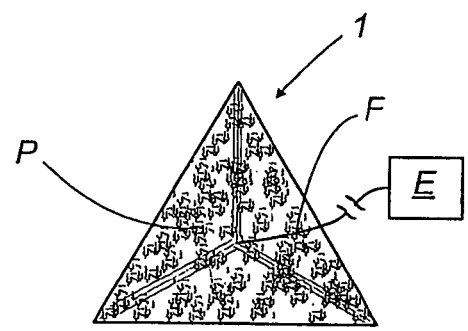
Figure 3:
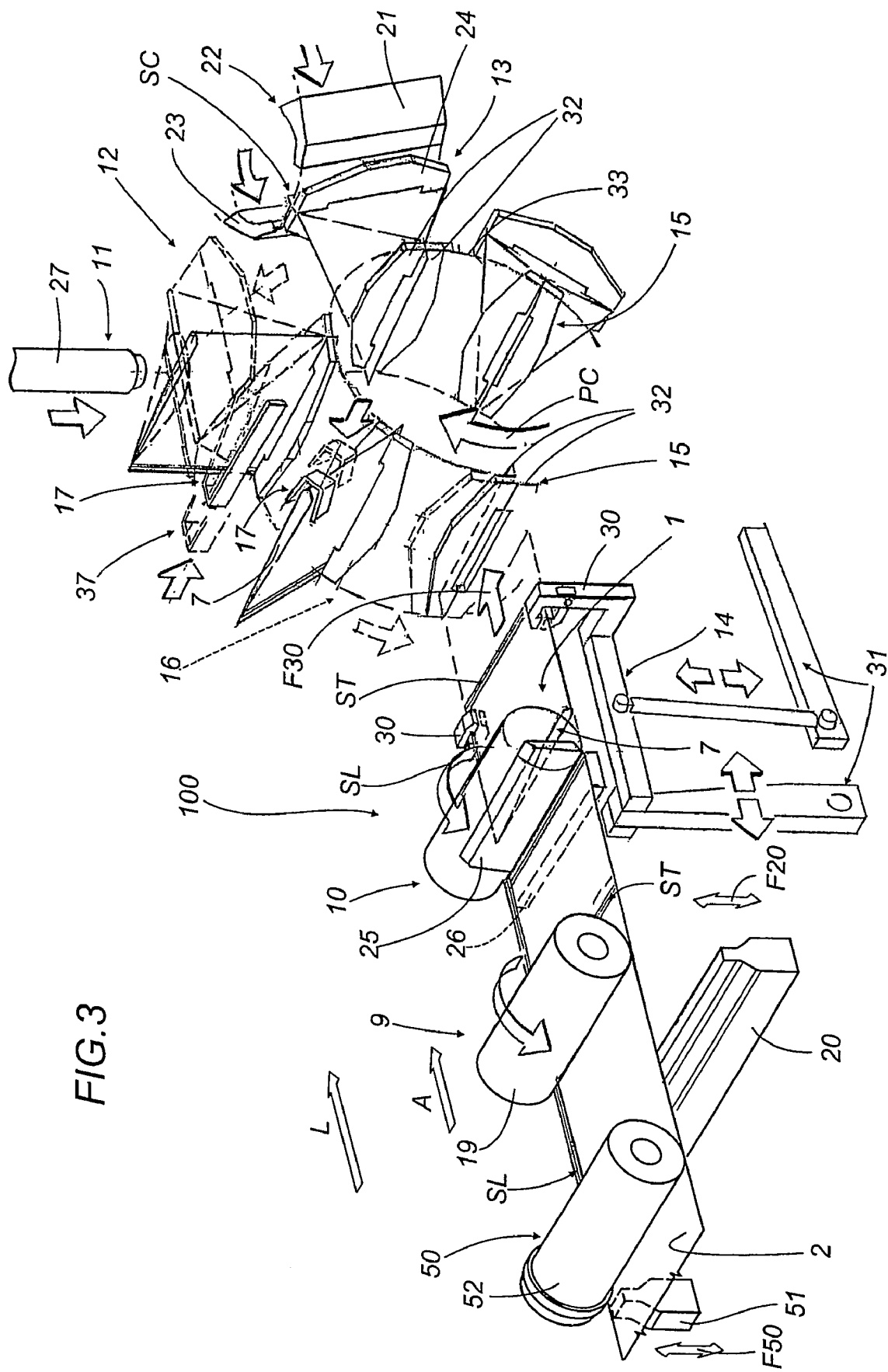
FIG. 3 is a schematic perspective view, partly in cross section and with some parts cut away for clarity, of the machine for making pyramidal filter bags like that illustrated in FIG. 1.

With reference to FIG. 3, the numeral 100 denotes in its entirety a machine for making filter bags 1 for containing an infusion product P, such as tea, camomile or the like and having a tetrahedral pyramidal shape defined by three triangular faces and a triangular base, as illustrated in FIGS. 1 and 2, with a tie string F connecting the filter bag to a pickup tag E.

As shown in FIG. 3, the machine 100 operates continuously and comprises a production line L extending in a substantially horizontal direction A and along which a plurality of stations are located in succession, as follows: a station (of known type and not illustrated) for folding a web of filter paper into the shape of a continuous flattened tube 2; a sealing station 50 for making a longitudinal seal SL (parallel to the direction A) and trimming the tube 2; a sealing station 9 for making a succession of transversal seals ST (transversally to the direction A) on the tube 2 to define the successive perimetric ends of each filter bag 1; a station 10 for cutting the flattened tube 2 transversely (again relative to the direction A) in such a way as to form individual filter bags 1, each having an opening or unsealed mouth 7; a station 11 for opening the mouth 7 and a dosing station 12 for filling a metered quantity or dose of infusion product P into each single filter bag 1 through the open mouth 7; and a further sealing station 13 for closing the open mouth 7 by making a seal SC extending in a direction transversal to the seal SL and to the seal ST in such a way as to produce the three-dimensional pyramidal shape, as explained in more detail below with reference to FIGS. 9 and 10.

In the direction A, between the cutting station 10 and the station 11, the machine 100 further comprises a transfer station 14 for gripping the filter bags 1 in the process of being formed, just after they have been cut, and transferring them one by one to filter bag 1 pickup means 15 mounted on conveyor means 16 which transport the filter bags 1 being formed along a curved stretch PC of the feed path in the line L passing through the aforementioned stations 11, 12 and 13.

Looking more closely at the constructional details of the aforementioned stations, the sealing station 50 comprises a contact element 52 (usually known as "anvil" to experts in the trade) located above an ultrasound emitter or sonotrode 51. The sonotrode 51 is reciprocatingly mobile in a vertical direction (arrow F50) between a position where it is away from the tube 2 and a position where it is close to the tube 2 and makes the seal SL by means of ultrasounds.

Similarly, the sealing station 9 comprises a contact element 19 located above an ultrasound emitter or sonotrode 20. The sonotrode 20 is reciprocatingly mobile in a vertical direction (arrow F20) between a position where it is away from the tube 2 and a position where it is close to the tube 2 and makes the seal ST by means of ultrasounds.

The use of sonotrodes 51 and 20 is the solution that provided the best results in terms of sealing speed during experimental tests and is therefore the solution considered preferable. In an alternative embodiment (not illustrated) the seals might be made by conventional heat sealing rollers instead of the sonotrodes 51 and 20, and in this case the elements 52 and 19 would be substituted by respective rollers.

As illustrated in FIG. 3, the cutting station 10 comprises a rotary knife 25 and a counterknife 26 located under the filter paper tube 2.

As it rotates, the knife 25 divides the tube 2 into a series of filter bags 1 by making a cut downstream, in the direction A, of each seal ST.

Again with reference to FIG. 3, the transfer station 14 comprises a pair of bilateral grippers 30 which hold each filter bag 1 while it is being cut.

The two grippers 30 are actuated by customary drive means 31 of the four-bar linkage type located under the tube 2 and designed to transfer each filter bag 1 by a translational movement (arrow F30) from the cutting station 10 to the pickup means 15.

As illustrated in FIGS. 3 and 4, the pickup means 15 comprise a plurality of pairs of grippers 32 uniformly and radially arranged on a revolving drum 33 constituting the aforementioned conveyor means 16.

The filter bags 1 in the process of being formed are transferred by the grippers 30 to the grippers 32, each pair of which picks up a filter bag 1 at a first transversal seal ST.

The revolving motion of the drum 33, which defines the stretch of feed path PC of the filter bags 1 in the process of being formed, turns the filter bags 1 in such a way that each filter bag 1 is positioned successively at the station 11 for opening the mouth 7, at the station 12 for dosing the product P and at the sealing station 13, as clearly shown in FIGS. 5 to As shown in FIG. 4, each pair of filter bag 1 pickup grippers 32 is equipped with filter bag 1 stabilising means 18 comprising a pair of parallel first rods 34 that support the filter bag 1 and extend perpendicularly to the grippers 32 to which they are attached on one side and which move as one with them.

The structure of the first rods 34 makes it possible to hold the filter bag 1 on both sides along the edge defined by the longitudinal seal SL when the grippers 32 close on the edge of the filter bag 1 defined by the transversal seal ST.

The stabilising means 18 further comprise a pair of second rods 35 centrally attached to the grippers 32, extending at an angle to the pair of first rods 34, and diverging from each other in such a way as to form a V-shaped element with pointed end at the pair of grippers 32: thanks to this stabilising structure, the filter bag 1 is optimally supported and located for the subsequent completion step in which the filter bag 1 is given its tetrahedral shape.

As illustrated in more detail in FIGS. 5 and 6, once the filter bag 1 has been picked up by the pair of grippers 32, the filter bag 1 is moved close to means 17 which prepare the filter bag 1 for opening and which comprise a first rigid contact element 36, having a C-shaped section and being mobile between an idle position (shown by the broken line in FIG. 5) in which it is away from the filter bag 1, and a working position where the first element 36 is in contact with and partly surrounds a part of the end of the mouth 7 so as to partly open it by pushing (as shown by the continuous line and arrow F36 in FIG. 5).

The preparation means 17 further comprise a second rigid element 37 which positions the filter bag 1 close to the dosing station 12 and which is operatively positioned to act on the edge of the filter bag 1 opposite the edge acted upon by the first rigid element 36.

As illustrated in FIG. 6, the second rigid element 37 comprises a fork, with two prongs 37a and 37b, mobile from a first idle position in which it is away from the filter bag 1 (broken line, FIG. 6), to a second, working position in which, following a horizontal translational movement, the second rigid element contacts and surrounds the filter bag 1 at the end being held by the pair of grippers 32 (continuous line and arrow F37, FIG. 6), and finally, to a third position in which the rigid element 37 stabilises the filter bag 1 by moving away from the pickup grippers 32 in the direction of the free end of the filter bag 1 where the mouth 7 is (broken line and arrow F37A, FIG. 6).

Thus, the filter bag 1 is in the correct position for receiving the product P, with the mouth 7 ready to be fully opened.

Figure 7:
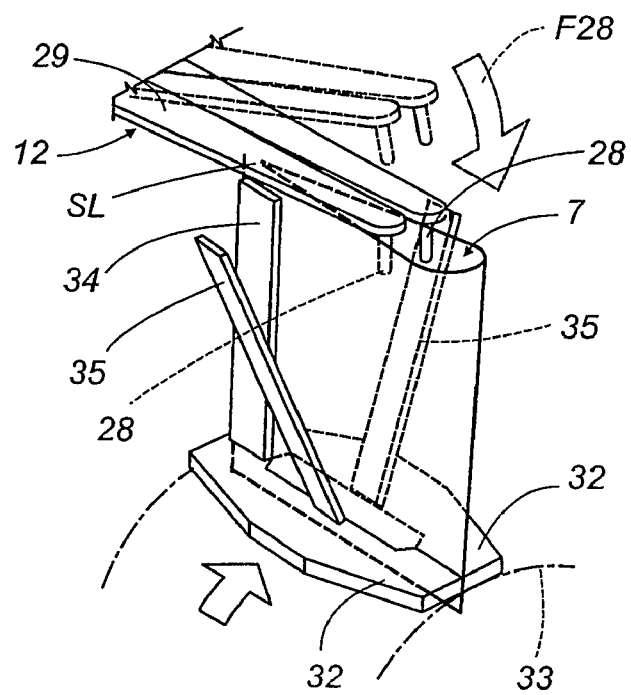
FIGS. 7, 8, 9 and 10 are close-up views showing successive steps performed at another station forming part of the machine of FIG. 3.

As illustrated in FIG. 7, the station 11 for opening the mouth 7 of each filter bag 1 comprises a pair of pins 28, each pin 28 being mounted on the end of an arm 29 operatively positioned above the mouth 7 of each filter bag 1. The pins 28 move as one with the respective arms 29 from a first raised idle position, in which the arms 29 are close together and away from the mouth 7 (broken line, FIG. 7), to a second lowered working position to prepare for opening, in which the pins 28 are inside the mouth 7 (continuous line and arrow F28, FIG. 7), and then to a third, intermediate position, where they partially open the mouth 7 so that a dose of the product P can be filled into it (arrows F28A, FIG. 8).

After reaching the above mentioned third working position, the pins 28 stop in such a way that the mouth 7 of the filter bag 1 is open at the product P dosing station 12.

Figure 8:
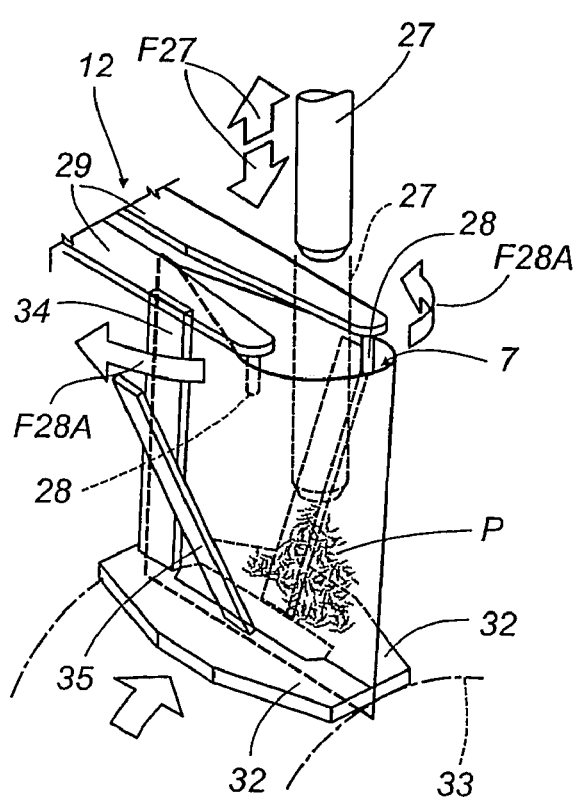

As illustrated in FIG. 8, the station 12 comprises a tubular nozzle 27 which doses the product P and which is supplied with the product P by a customary metering device that is not illustrated.

The nozzle 27 is mobile between an idle position in which the nozzle 27 is away from the filter bag 1 (continuous line, FIG. 8) and a dosing position in which the nozzle 27 is inside the filter bag 1 through the mouth 7 (broken line and arrow F27, FIG. 8).

Figure 9:
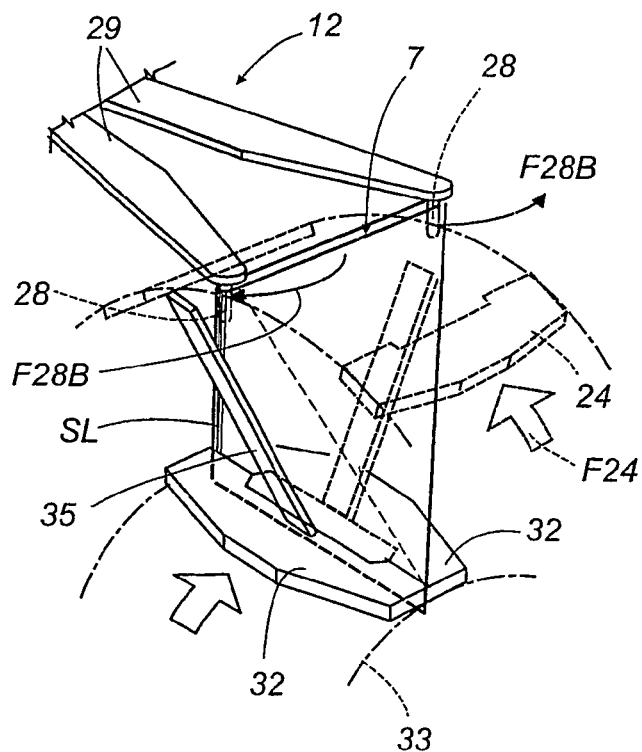

When the nozzle 27 is lifted, the arms 29 move to a fourth working position in which the arms 29 move further apart in such a way that the pins 28 exert a pulling action on the mouth 7 (arrow F28, FIG. 9).

At this point, the revolving drum 33 moves the filter bag 1 close to the station 13 where the seal SC is made.

Figure 10:
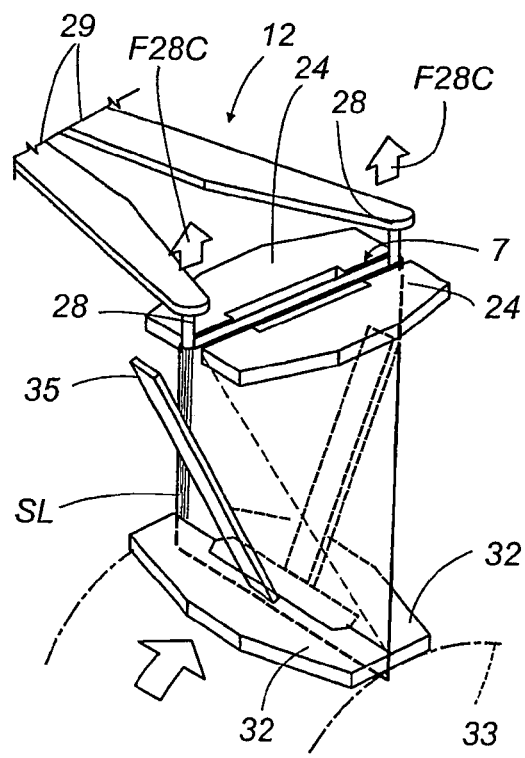

As shown in more detail in FIGS. 9 and 10, the sealing station 13 is equipped with a pair of grippers 24 for holding the inside edge of the mouth 7 in such a way as to stabilise the opposite edges of the mouth 7 (as shown by the arrow F24 indicating the direction of its movement). Obviously, the width of the pair of grippers 24 is smaller than the width of the edge formed by pulling the mouth 7, thus enabling the pins 28 to be pulled out (arrows F28C, FIG. 10). Similarly, the pair of grippers 24 come into contact with the filter bag 1 at a position that is lower down than the free edge formed by pulling the mouth 7, leaving a part free so that the seal SC can be made.

Figure 11:
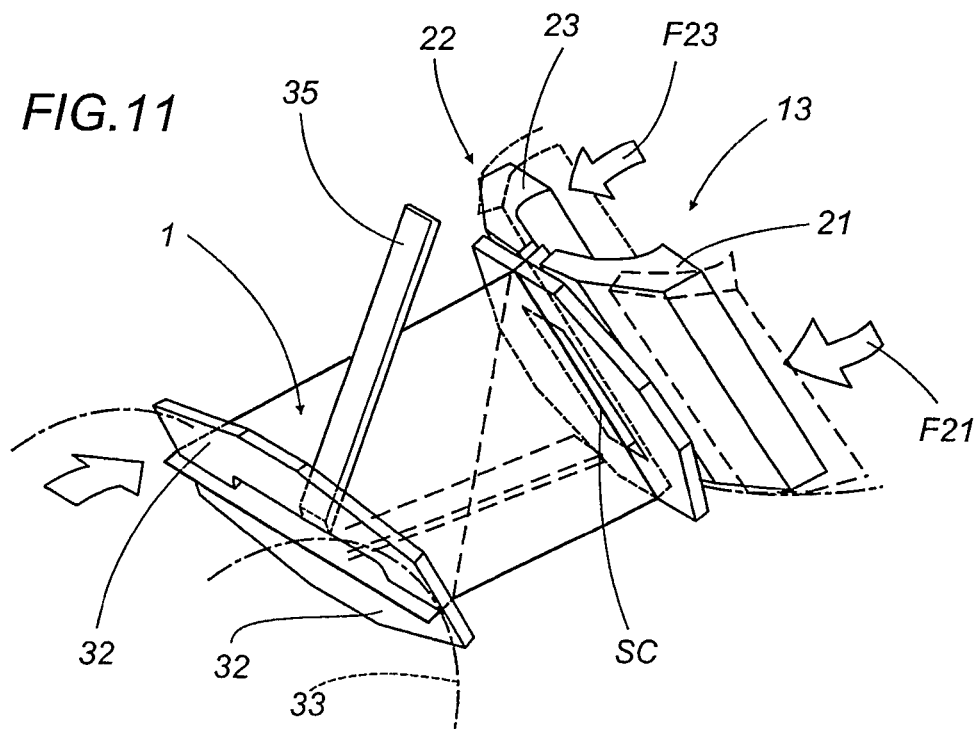
FIG. 11 shows another station, forming part of the machine illustrated in the schematic view of FIG. 3, during the performance of a step according to the present invention.

As illustrated in FIG. 11, the seal SC is preferably an ultrasound seal made by an ultrasound sealing unit 22 in which an anvil 23 is operatively positioned to act as a base for an ultrasound emitter or sonotrode 21.

As in the case of the seals SL and ST, the use of a sonotrode 21 is the solution that provided the best results in terms of sealing speed during experimental tests and is therefore the solution considered preferable. In an alternative embodiment (not illustrated) the seals might be made by a conventional heat sealing device instead of the sonotrode 21, and in this case the element 23 would be substituted by another gripper.

As clearly shown in FIG. 11, the sonotrode 21 and the anvil 23 (or, alternatively, the grippers 21 and 23) are mobile between an idle position in which they are away from the edge of the mouth 7 (broken line, FIG. 11), and a working position in which they contact and join the edge of the filter bag 1 (continuous line and arrows F21 and F23, FIG. 11).

Once the seal SC has been made, the filter bag 1 is finished and has a tetrahedral shape such as that shown in FIGS. 1 and 2, and can be released by the drum 33 and transferred to stacking and cartoning units downstream.

The machine and the method it embodies achieve the aforementioned aims of the invention thanks to the simplified rapid process of forming the filter bags 1 which, unlike those made by the methods hitherto known, are first partly formed one by one, then filled with product through their open ends and lastly sealed in their final tetrahedral shape.

The possibility of feeding a tube of filter paper horizontally and of forming the filter bag before dosing the product and sealing the filter bag means that the apparatus is more functional and much more compact than prior art apparatus, which makes it possible to produce filter bags of this type at a much lower cost without reducing machine speed and output.

The invention described can be subject to modifications and variations without thereby departing from the scope of the inventive concept. Moreover, all the details of the invention may be substituted by technically equivalent elements.

The invention claimed is:

1. A machine for making filter bags of tetrahedral shape for infusion products, the machine comprising a production line defined by a series of operating stations where filter bags made from a continuous flattened tube of filter paper are formed, filled with respective doses of infusion product and subjected to successive cuts and closing seals, the production line extending in a horizontal direction and comprising, in succession, a first sealing station for making the first longitudinal seal to form the tube to extend in a direction parallel to the horizontal direction the production line extends;

a second tube sealing station for making a succession of transversal seals on the tube transversally to the horizontal direction the production line extends;

a cutting station for cutting the tube at the transversal seals to create a succession of filter bags in the process of being formed, each having a sealed bottom end and an unsealed end;

an opening station for opening the unsealed end of each filter bag;

a dosing station for dosing the infusion product, where a dose of the product is inserted into the filter bag through the unsealed opened end; and a third sealing station for making a seal that closes the end of each filter bag that is still open, the closing seal extending in a direction transverse to the longitudinal seal and to the transversal seal;

a transfer station provided between the cutting and opening stations, wherein, in the process of being formed, each filter bag is picked up from the cutting station and fed to the opening station by conveyor means, wherein the conveyor means comprises a revolving drum designed to feed the filter bags along a curved stretch of the feed path in the line passing through the opening, dosing and third sealing stations, wherein the revolving drum supports retaining/stabilising means for picking up and holding the filter bags on the revolving drum, and wherein the retaining/stabilising means comprise:

pairs of grippers, each of which picks up a single filter bag and is eguipped with a pair of first filter bag support rods parallel to each other and extending perpendicularly to the grippers, a pair of second rods centrally attached to the grippers, extending at an angle to the pair of first rods, and diverging from each other in such a way as to form a V-shaped element with pointed end at the pair of grippers; and a first rigid element and a second rigid element designed to permit each filter bag to be positioned at the dosing station.

2. The machine according to claim 1, wherein the first sealing station comprises ultrasound sealing means for making the longitudinal seal; the ultrasound sealing means comprising at least one sonotrode that moves towards and away from a contact element.

3. The machine according to claim 1, wherein the first sealing station comprises heat sealing means for making the longitudinal seal.

4. The machine according to claim 1, wherein the second sealing station comprises ultrasound sealing means for making the transversal seals; the ultrasound sealing means comprising at least one sonotrode that moves towards and away from a contact element.

5. The machine according to claim 1, wherein the second sealing station comprises heat sealing means for making the transversal seals.

6. The machine according to claim 1, wherein the third sealing station comprises ultrasound sealing means for making the closing seal; the ultrasound sealing means comprising at least one sonotrode that moves towards and away from a contact element.

7. The machine according to claim 1, wherein the third sealing station comprises heat sealing means for making the closing seal.

8. The machine according to claim 1, wherein the dosing station comprises a nozzle for dosing the product; the nozzle being mobile between an idle position in which the nozzle is away from the filter bag and a dosing position in which the nozzle is inside the filter bag through the unsealed end.

9. The machine according to claim 1, wherein the station for opening the unsealed end comprises a pair of pins, each pin being mounted on an arm; the arms and the pins being mobile from a first raised idle position, in which each arm is away from the end and close to the other arm, to a second lowered working position to prepare for opening, in which the pins are inside the end, to a third position, where the pins open the end to allow a dose of the product to be filled into the filter bag, to a fourth working position where the arms have moved further apart in such a way that the pins exert a pulling action on the unsealed end.

10. A machine for making filter bags of tetrahedral shape for infusion products, the machine comprising a production line defined by a series of operating stations where filter bags made from a continuous flattened tube of filter paper are formed, filled with respective doses of infusion product and subjected to successive cuts and closing seals; the production line extending in a horizontal direction and comprising, in succession, a first sealing station for making the first longitudinal seal to form the tube to extend in a direction parallel to the horizontal direction the production line extends;

a second tube sealing station for making a succession of transversal seals on the tube transversally to the horizontal direction the production line extends;

a cutting station for cutting the tube at the transversal seals to create a succession of filter bags in the process of being formed, each having a sealed bottom end and an unsealed end;

an opening station for opening the unsealed end of each filter bag;

a dosing station for dosing the infusion product, where a dose of the product is inserted into the filter bag through the unsealed opened end; and a third sealing station for making a seal that closes the end of each filter bag that is still open; the closing seal extending in a direction transverse to the longitudinal seal and to the transversal seal;

wherein the opening station, the dosing station and the third sealing station are placed in succession along a curved stretch path defined by a revolving drum designed to feed the filter bags along said path in the line passing through the opening, dosing and third sealing stations; the revolving drum comprising pairs of grippers each of which picks up a single filter bag and is equipped with a pair of first filter bag support rods parallel to each other and extending perpendicularly to the grippers, a pair of second rods centrally attached to the grippers, extending at an angle to the pair of first rods, and diverging from each other in such a way as to form a V-shaped element with pointed end at the pair of grippers; and a first rigid element and a second rigid element designed to permit each filter bag to be positioned at the dosing station.

11. The machine according to claim 10, wherein the first sealing station comprises ultrasound sealing means for making the longitudinal seal; the ultrasound sealing means comprising at least one sonotrode that moves towards and away from a contact element.

12. The machine according to claim 10, wherein the first sealing station comprises heat sealing means for making the longitudinal seal.

13. The machine according to claim 10, wherein the second sealing station comprises ultrasound sealing means for making the transversal seals; the ultrasound sealing means comprising at least one sonotrode that moves towards and away from a contact element.

14. The machine according to claim 10, wherein the second sealing station comprises heat sealing means for making the transversal seals.

15. The machine according to claim 10, wherein the third sealing station comprises ultrasound sealing means for making the closing seal; the ultrasound sealing means comprising at least one sonotrode that moves towards and away from a contact element.

16. The machine according to claim 10, wherein the third sealing station comprises heat sealing means for making the closing seal.

17. The machine according to claim 10, wherein the dosing station comprises a nozzle for dosing the product; the nozzle being mobile between an idle position in which the nozzle itself is away from the filter bag and a dosing position in which the nozzle itself is inside the filter bag through the unsealed end.

18. The machine according to claim 10, wherein the station for opening the unsealed end comprises a pair of pins, each pin being mounted on an arm; the arms and the pins being mobile from a first raised idle position, in which each arm is away from the end and close to the other arm, to a second lowered working position to prepare for opening, in which the pins are inside the end, to a third position, where the pins open the end to allow a dose of the product to be filled into the filter bag, to a fourth working position where the arms have moved further apart in such a way that the pins exert a pulling action on the unsealed end.

* * * * *